(12) United States Patent
Lee et al.

(10) Patent No.: US 7,755,859 B2
(45) Date of Patent: Jul. 13, 2010

(54) LENS ASSEMBLY OF CAMERA MODULE

(75) Inventors: Young Ho Lee, Gyunggi-do (KR); Ju Sung Park, Gyunggi-do (KR); Young Kyu Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/314,268

(22) Filed: Dec. 5, 2008

(65) Prior Publication Data

US 2010/0007972 A1 Jan. 14, 2010

(30) Foreign Application Priority Data

Jul. 11, 2008 (KR) .................. 10-2008-0067617

(51) Int. Cl.
G02B 21/02 (2006.01)
(52) U.S. Cl. ........................ 359/823; 359/811
(58) Field of Classification Search .......... 359/823, 359/811
See application file for complete search history.

(56) References Cited

U.S. PATENT DOCUMENTS

| | | | |
|---|---|---|---|
| 5,150,260 A * | 9/1992 | Chigira | 359/694 |
| 5,748,394 A | 5/1998 | Shimazaki et al. | |
| 6,501,604 B2 | 12/2002 | Onda | |
| 7,339,756 B2 * | 3/2008 | Tengeiji et al. | 359/811 |
| 2006/0245309 A1 | 11/2006 | Saito | |

FOREIGN PATENT DOCUMENTS

| | | |
|---|---|---|
| JP | 05-100138 | 4/1993 |
| JP | 6-308361 | 11/1994 |
| JP | 2007-199133 | 8/2007 |
| KR | 10-2007-0121304 | 12/2007 |

OTHER PUBLICATIONS

German Office Action issued on Apr. 2, 2009 in corresponding German Patent Application 10 2008 057 879.7.
German Office Action issued Mar. 10, 2010, in corresponding German Patent Application No. 102008057879.7.

* cited by examiner

*Primary Examiner*—Jordan M. Schwartz
*Assistant Examiner*—James C Jones

(57) ABSTRACT

A lens assembly of a camera module mounted in a small portable device includes a body receiving at least one lens and having a hole at one side, a screw member inserted in the hole in a direction substantially parallel to an optical axis, a support boss provided at the other side of the body and including a coupling hole formed in a direction substantially parallel to the optical axis, and a guide groove formed at one side of a side surface of the support boss, a shaft coupled with the coupling hole of the support boss and guiding a movement of the body, and a guide member having one side elastically and tightly attached to the screw member and moved by rotation of the screw member, and the other side coupled with the shaft to be movable along the guide groove and moving the body along the optical axis.

5 Claims, 4 Drawing Sheets

LENS ASSEMBLY OF CAMERA MODULE

CROSS-REFERENCE TO RELATED APPLICATIONS

This application claims the priority of Korean Patent Application No. 2008-67617 filed on Jul. 11, 2008, in the Korean Intellectual Property Office, the disclosure of which is incorporated herein by reference.

BACKGROUND OF THE INVENTION

1. Field of the Invention

The present invention relates to a lens assembly of a camera module, and more particularly, to a lens assembly of a camera module, which can be mounted in a small portable device such as a mobile communication terminal.

2. Description of the Related Art

Recently, a small camera module has been applied to a portable mobile communication device such as a camera phone, a personal digital assistant (PDA) and a smart phone, and a variety of information technology (IT) devices. As those devices become smaller and slimmer, the camera module is also being miniaturized.

The camera module includes an image sensor as a main component, such as a charge coupled device (CCD) or a complementary metal-oxide semiconductor (CMOS). The image sensor captures an image of an object, and image data is stored on a memory of a device. The stored data is output as an image through a display medium such as a liquid crystal display device (LCD) in a device or a monitor of a personal computer (PC).

A high-performance camera module having an auto-focus function, a zoom function and the like is being mounted in a small electronic device such as a mobile communication terminal.

FIGS. 1 and 2 illustrate a zoom lens barrel assembly employed in a related art digital camera device. Limitations in miniaturizing the camera module being mounted in the small portable device can be described using the zoom lens barrel assembly although they may be considered different in terms of an invention field.

The zoom lens barrel assembly of the related art digital camera device is disclosed in Korean Patent Publication No. 2007-0121304.

As shown in FIGS. 1 and 2, the zoom lens barrel assembly mounted in the related art digital camera device includes a movable lens group 102 including a lens 200, a clip mechanism 212, and a lead screw 116.

Holes 202 and 203 are formed at one side of the movable lens group 102. A shaft 112 is inserted in the holes 202 and 204 to guide the movable lens group 102 in an optical axis direction.

The clip mechanism 212 is coupled to a clip coupling part 208, and a screw coupling part 308 is coupled with the lead screw 116.

A screw thread 214 is formed on the screw coupling part 214 to be engaged with the lead screw 116.

As shown in FIG. 2, a torsion spring 216 is inserted in spring guide walls 302 formed at the clip mechanism 212. The torsion spring 216 has one foot 217 supported by an inner end of the clip coupling part 208, and the other foot 215 supported by a boss 306 of the clip mechanism 215. Thus, the screw coupling part 308 is tightly attached to the lead screw 116 by an elastic force of the torsion spring 216.

The torsion spring 216 of the lens barrel assembly of FIGS. 1 and 2 provides an elastic force to firmly engage the clip mechanism 212 with the lead screw 116. For this reason, without the torsion spring 216, lens driving may be impossible. Thus, the torsion spring 216 may be considered essential for driving of the lens barrel assembly.

In the case of the lens barrel assembly used in the digital camera device of FIGS. 1 and 2, there is no need to miniaturize the torsion spring 216 because the digital camera device has a much greater size than a camera module mounted in a mobile communication terminal or the like. However, to manufacture a similar lens barrel assembly for the camera module of the mobile communication terminal, a torsion spring needs to be very small because of such a small size of the camera module.

For smaller mobile communication terminals, it is necessary to use smaller torsion springs. In this case, the torsion springs become so small that they cannot be observed with the naked eye.

However, it is impossible to manufacture such small torsion springs. Even if it is possible, the torsion springs fail to provide a sufficient elastic force.

Therefore, there is a need for a camera module that can be miniaturized and drive a lens without a torsion spring.

SUMMARY OF THE INVENTION

An aspect of the present invention provides a lens assembly of a camera module, which can allow the camera module to have a small size suitable for a mobile communication terminal or the like by not using a torsion spring, and achieve sufficient operational reliability without the torsion spring.

According to an aspect of the present invention, there is provided a lens assembly of a camera module mounted in a small portable device, including: a body receiving at least one lens and having a hole at one side; a screw member inserted in the hole in a direction substantially parallel to an optical axis; a support boss provided at the other side of the body and including a coupling hole formed in a direction substantially parallel to the optical axis, and a guide groove formed at one side of a side surface of the support boss; a shaft coupled with the coupling hole of the support boss and guiding a movement of the body; and a guide member having one side elastically and tightly attached to the screw member and moved by rotation of the screw member, and the other side coupled with the shaft to be movable along the guide groove and moving the body along the optical axis.

The guide member may include: a body part; a fixed support part extending from the body part and including a guide protrusion engaged with the screw member; and an elastic support portion extending from the fixed support part and providing an elastic force to tightly attach the fixed support part to the screw member.

The elastic support part may include a plurality of elastic support parts extending from the fixed support part.

The guide member may further include: a flange part extending from the body part and having a through hole inserted in the support boss such that the shaft passes through the through hole; and a neck part connecting the flange part with the body part and moving along the guide groove.

The elastic support part may include: a fixed portion extending from the fixed support part to be fixed; and an elastic portion extending from the fixed portion and provided to be elastically movable.

A distance between an end of the elastic portion and the fixed support part may be smaller than a diameter of the screw member. Thus, when the screw member is provided between the fixed support part and the elastic portion, the elastic portion tightly attaches the screw member to the fixed support part with an elastic force thereof.

BRIEF DESCRIPTION OF THE DRAWINGS

The above and- other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
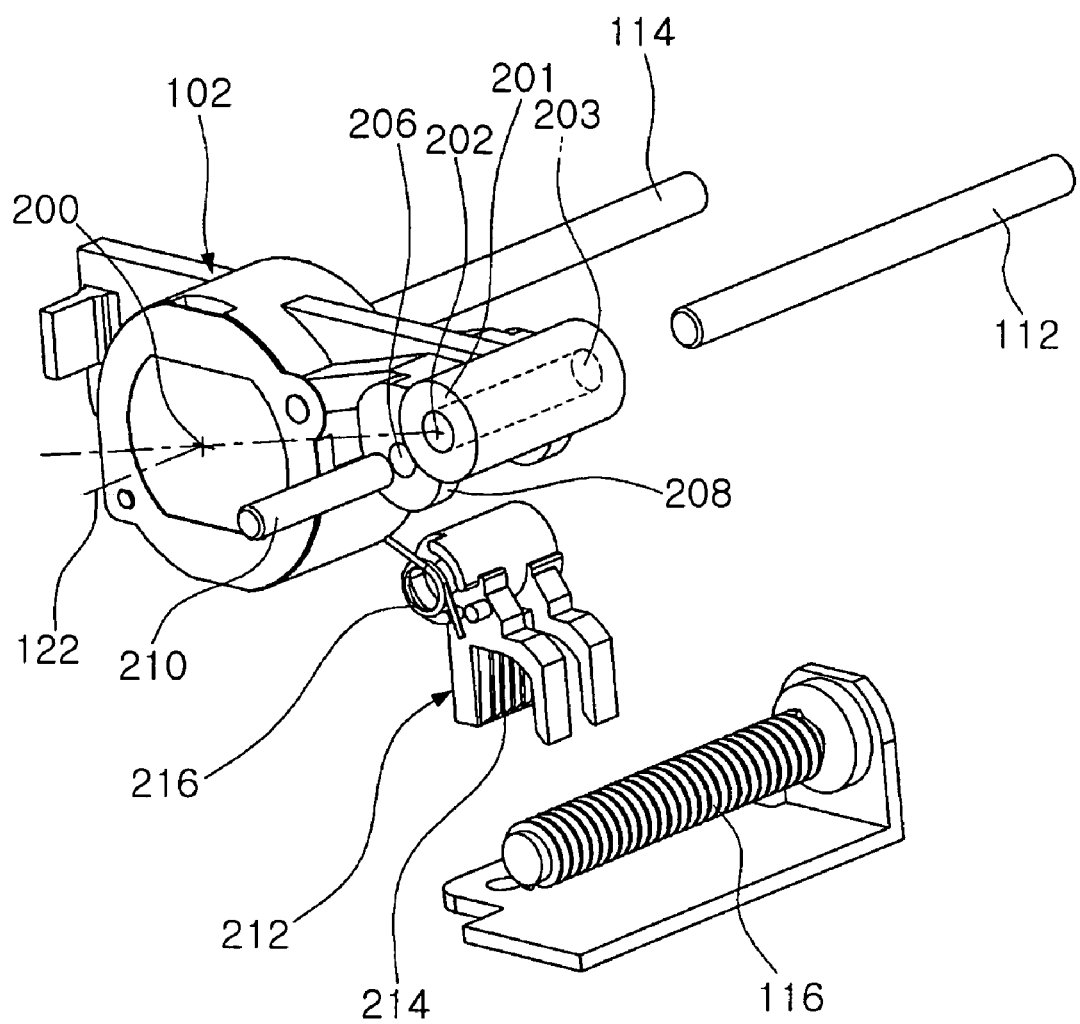
FIGS. 1 and 2 are views illustrating a structure of a lens barrel assembly used in a related art digital camera device.
Figure 2:
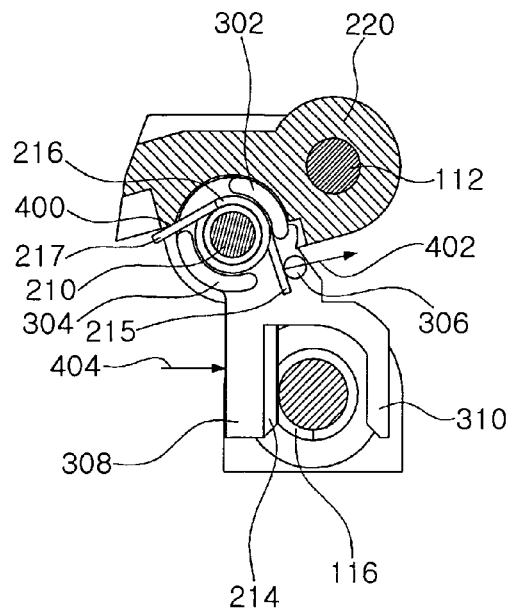
Figure 3:
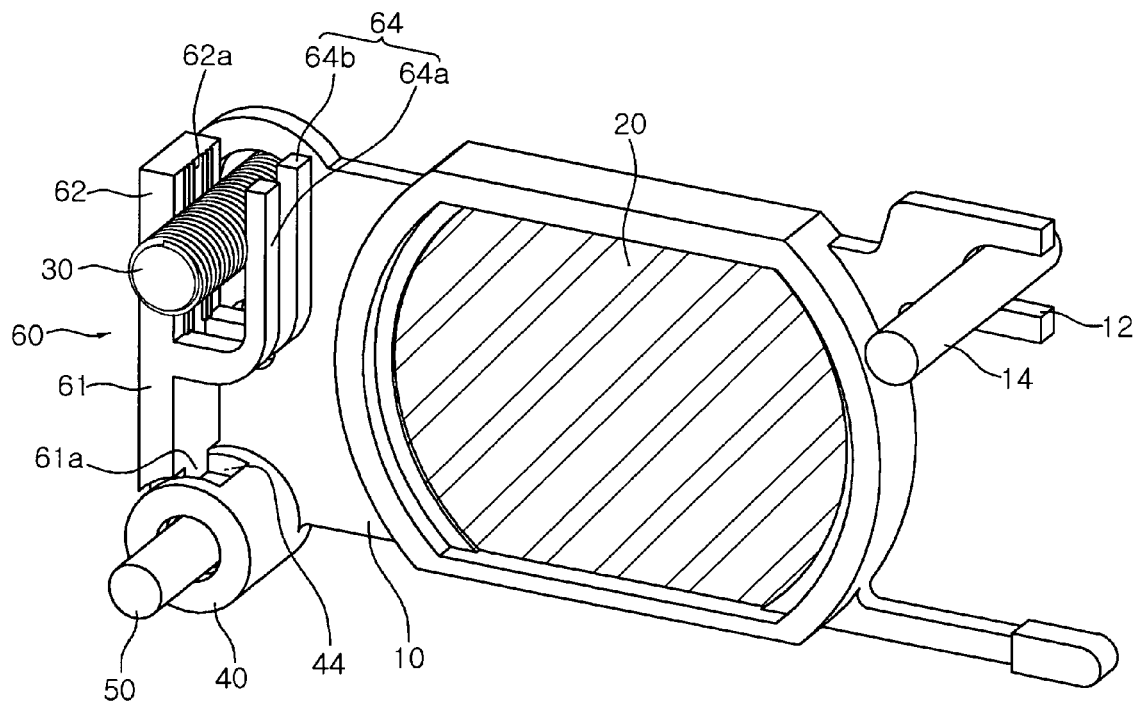
FIG. 3 is a perspective view of a lens assembly of a camera module mounted in a small portable device, according to an exemplary embodiment of the present invention.
Figure 4:
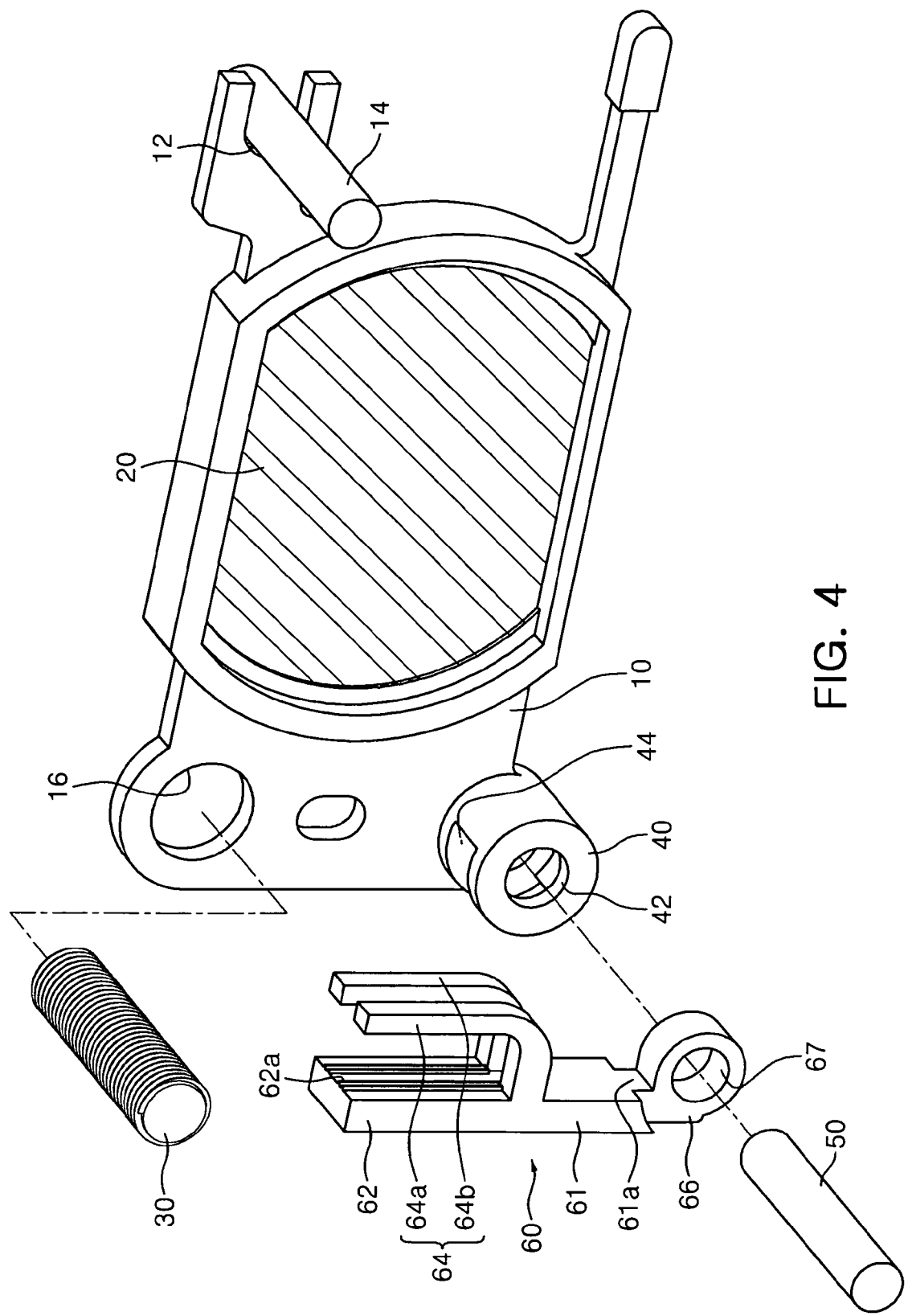
FIG. 4 is an exploded perspective view of the lens assembly of FIG. 3.
Figure 5A:
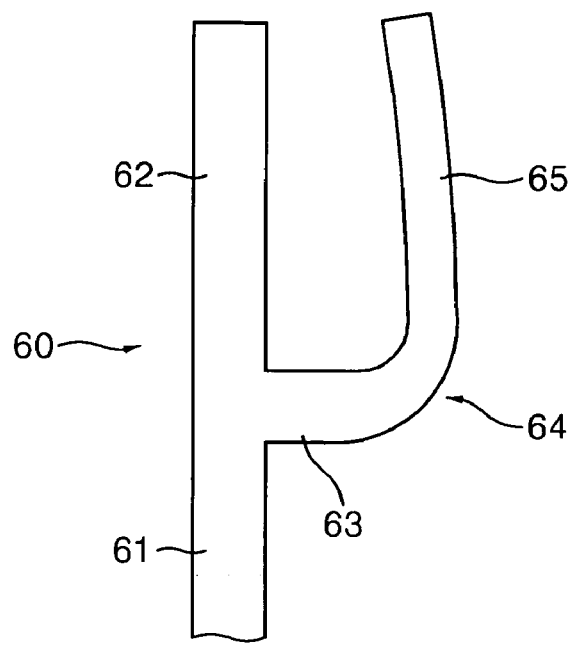
FIGS. 5A and 5B illustrate coupling relations between a guide member and a screw member according to the embodiment of FIG. 4.
Figure 5B:
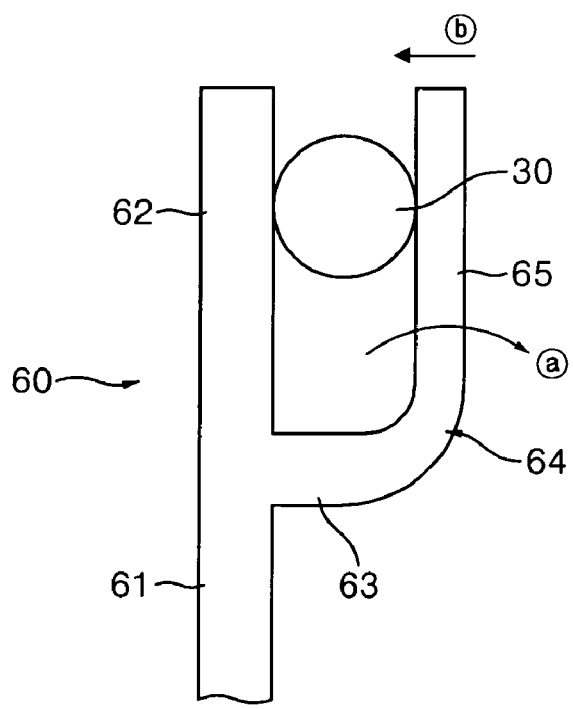

FIG. 3 is a perspective view of a lens assembly of a camera module according to an exemplary embodiment of the present invention. FIG. 4 is an exploded perspective view of the lens assembly of FIG. 3. FIGS. 5A and 5B illustrate a guide member of FIG. 4.

As shown in FIGS. 3 and 4, the lens assembly of the camera module according to the exemplary embodiment of the present invention is a lens assembly that is used for a camera module mounted in a mobile communication terminal, for example, a small portable device such as a portable phone or a personal portable communication device (e.g., a personal digital assistance (PDA)).

The camera module includes a plurality of lens assemblies. The plurality of lens assemblies may include fixed lens assemblies, and movable lens assemblies which can move in an optical axis direction. Alternatively, all of the lens assemblies may be provided as movable lens assemblies.

Moving the lens assemblies in the optical axis direction is for an auto-focus function or a zoom function.

The lens assembly of FIGS. 3 and 4 represents one of the above lens assemblies.

As shown in FIGS. 3 and 4, the lens assembly of the camera module according to the exemplary embodiment of the present invention includes a body 10 receiving a lens 20, a screw member 30 and a guide member 60 moving the body 10, a support shaft 14 supporting and guiding the body 10, and a support groove 12 receiving the support shaft 14.

The lens assembly includes a support boss 40 at one side of the body 10. The support boss 40 is coupled with a shaft 50, and provides support for the guide member 60 to be movably coupled with the shaft 50.

The support shaft 14 is fixedly provided, and the support groove 12 formed at the body 10 is inserted onto the support shaft 14 to slide and guide a movement of the body 10.

The support shaft 14 also guides a movement of another lens assembly and serves to support all the lens assemblies of the camera module.

The shaft 50 is provided substantially diagonally to the support shaft 14, and guides and supports the movement of the body 10.

That is, the shaft 50 and the support shaft 14 diagonally support the body 10 and guide the movement of the body 10.

The shaft 50 is coupled with the support boss 40. The shaft 50 may be fixedly coupled with a coupling hole 42 of the support boss 40. Alternatively, the shaft 50 may be movably coupled with the coupling hole 42 such that the support boss 40 can slide along the shaft 50.

The support boss 40 includes the coupling hole 42 formed in an optical axis direction, and a guide groove 44 formed at one side of its side surface.

The guide groove 44 guides the guide member 60 to move along the guide groove 44.

A hole 16 is formed at a portion of the body 10 spaced apart from the support boss 40 at a predetermined distance. The screw member 30 is inserted in the hole 16. The screw member 30 has a screw thread around its surface.

Although not shown, the screw member 30 is connected to a predetermined driving device and thus can be rotated.

Like the support shaft 14 and the shaft 50, the screw member 30 is provided substantially parallel to the optical axis direction.

The guide member 60 has one side coupled with the support boss 40 and supported by the shaft 50, and the other side coupled with the screw member 30. Thus, as the screw member 30 is rotated, the guide member 60 moves in the optical axis direction to guide the movement of the body 10.

As shown in FIGS. 4 and 5, the guide member 60 may include a body part 61, a fixed support part 62, elastic support parts 64a and 64b, and a flange part 66.

The fixed support part 62 extends from the body part 61, and may have a guide protrusion 62a on its inner surface to be engaged with the screw member 30.

The elastic support parts 64a and 64b extend from the fixed support part 62, and provide an elastic force to tightly attach the fixed support part 62 to the screw member 30.

The flange part 66 has a though hole 67, and is inserted in the support boss 40 such that the shaft 50 can be inserted in the through hole 67.

The guide member 60 includes a neck part 61a connecting the body part 61 with the flange part 66. When the flange part 66 is inserted in the support boss 40, the neck part 61a passes through the guide groove 44. The neck part 61a may be movable along the guide groove 44.

By providing the neck part 61a to be movable in the guide groove 44, a small portable device provided with the camera module can flexibly cope with external impact being applied thereto.

The coupling relation between the guide member 60 and the screw member 30 will now be described in more detail with reference to FIGS. 5A and 5B.

Referring to FIGS. 5A and 5B, the elastic support part 64 includes a fixed portion 63 extending from the fixed support part 62, and an elastic portion 65 extending from the fixed portion 63 to be elastically movable.

As shown in FIG. 5A, the elastic portion 65 bends toward the fixed support part 62. For the coupling with the screw member 30, the elastic portion 65 needs to bend outwardly in a direction of an arrow ⓐ of FIG. 5B. When the screw ember 30 is coupled with the guide member 60, the elastic portion 65 provides an elastic force in a direction of an arrow ⓑ of FIG. 5B.

The elastic force applied in the direction of the arrow ⓑ tightly attaches the fixed support part 62 to the screw member 30. While the screw member 30 rotates, the elastic portion 64 continuously applies the elastic force for the tight attachment, thereby moving the fixed support part 62 along the screw member 30.

An operation of the lens assembly of the camera module according to an exemplary embodiment of the present invention will now be described with reference to FIGS. 3 through 5.

When a predetermined signal is applied for auto-focusing or zooming, the driving device (not shown) operates to rotate the screw member 30.

As the screw member 30 is rotated, the fixed support part 62 of the guide member 60 moves along the screw member 30 in an optical axis direction because the fixed support part 62 is engaged with the screw member 30 by its guide protrusion 62a.

The elastic portion 65 of the elastic support part 64 of the guide member 60 pushes the screw member 30 with its elastic force, and the elastic portion 65 is connected with the fixed support part 62 through the fixed portion 63. Accordingly, the fixed support part 62 can be continuously tightly attached to the screw member 30.

As the guide member 60 moves in the optical axis direction, a driving force is also applied to the flange part 66 of the guide member 60 inserted in the support boss 40, thereby moving the body 10 in the optical axis direction.

When external impact is applied, the guide member 60 can move to absorb the external impact because the neck part 61a of the guide member 60 can move along the guide groove 44 of the support boss 40.

Accordingly, the damage to the guide member 60 caused by the external impact can be easily prevented.

The lens assembly of the camera module includes the elastic support part at the guide member as a substitute for a torsion spring of a lens assembly of a related art digital camera device. The elastic support part provides a support force from its elastic force, and the guide member is configured to be movable along the guide groove of the support boss, so that the external impact can be absorbed.

In the lens assembly according to the present invention, the guide member and the support boss sufficiently perform functions of the related art torsion spring, and thus the torsion spring is unnecessary. Thus, the lens assembly can be miniaturized.

The lens assembly of the camera module mounted in the small portable device does not require a separate elastic unit such as a torsion spring, so that it can have a small size suitable for a small portable device such as a mobile communication terminal. Also, the lens assembly according to the present invention can achieve good operational performance without a separate elastic-force providing unit. As the structure of the camera module is simplified, an assembly process is facilitated, and manufacturing cost and time can be saved.

While the present invention has been shown and described in connection with the exemplary embodiments, it will be apparent to those skilled in the art that modifications and variations can be made without departing from the spirit and scope of the invention as defined by the appended claims.

What is claimed is:

1. A lens assembly of a camera module mounted in a small portable device, the lens assembly comprising:
    a body receiving at least one lens and having a hole at one side;
    a screw member inserted in the hole in a direction substantially parallel to an optical axis;
    a support boss provided at an other side of the body and including a coupling hole formed in a direction substantially parallel to the optical axis, and a guide groove formed at one side of a side surface of the support boss;
    a shaft coupled with the coupling hole of the support boss and guiding a movement of the body; and
    a guide member comprising
        one side elastically and tightly attached to the screw member and moved by rotation of the screw member,
        an other side coupled with the shaft to be movable along the guide groove and moving the body along the optical axis,
        a body part,
        a fixed support part extending from the body part and including a guide protrusion engaged with the screw member, and
        an elastic support portion extending from the fixed support part and providing an elastic force to tightly attach the fixed support part to the screw member.

2. The lens assembly of claim 1, wherein the elastic support part comprises a plurality of elastic support parts extending from the fixed support part.

3. The lens assembly of claim 1, wherein the guide member further comprises:
    a flange part extending from the body part and having a through hole inserted in the support boss such that the shaft passes through the through hole; and
    a neck part connecting the flange part with the body part and provided to move along the guide groove.

4. The lens assembly of claim 1, wherein the elastic support part comprises:
    a fixed portion extending from the fixed support part to be fixed; and
    an elastic portion extending from the fixed portion and provided to be elastically movable.

5. The lens assembly of claim 4, wherein a distance between an end of the elastic portion and the fixed support part is smaller than a diameter of the screw member such that when the screw member is provided between the fixed support part and the elastic portion, the elastic portion tightly attaches the screw member to the fixed support part with an elastic force thereof.

* * * * *